G. C. THOMAS.
APPARATUS FOR TAKING KINEMATOGRAPHIC (OR OTHER) PHOTOGRAPHS AND PROJECTING SAME.
APPLICATION FILED SEPT. 3, 1910.
1,040,591.
Patented Oct. 8, 1912.
4 SHEETS—SHEET 2.
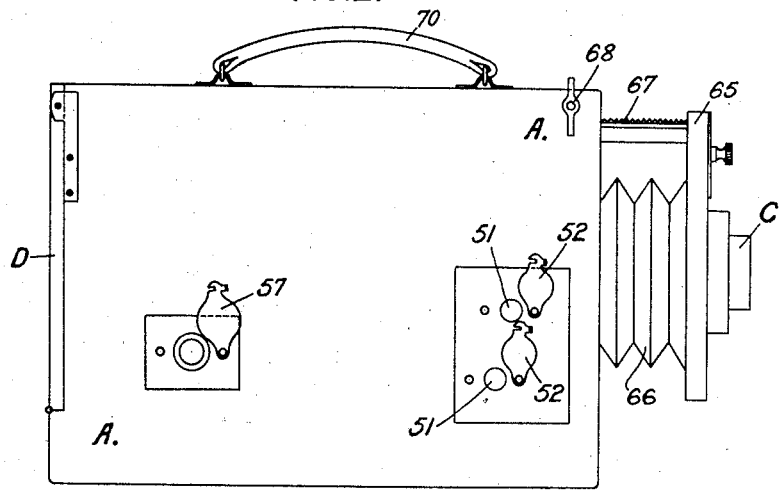
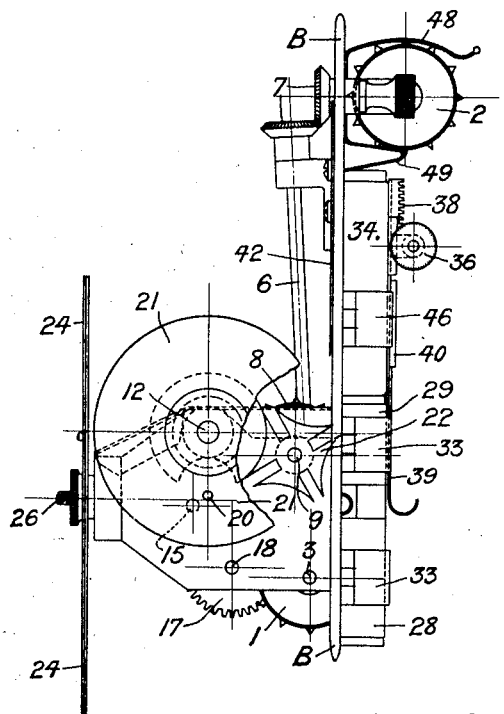
WITNESSES
W. P. Burke
John A. Percival
INVENTOR
George Charles Thomas
BY
Jno Wallace White G. C. THOMAS.
APPARATUS FOR TAKING KINEMATOGRAPHIC (OR OTHER) PHOTOGRAPHS AND PROJECTING SAME.
APPLICATION FILED SEPT. 3, 1910.
1,040,591.
Patented Oct. 8, 1912.
4 SHEETS—SHEET 3.
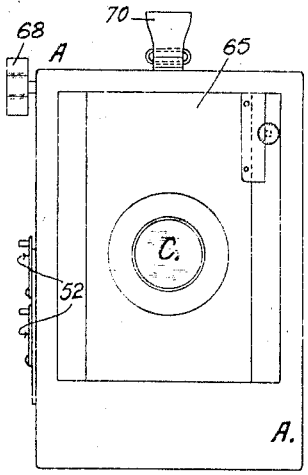
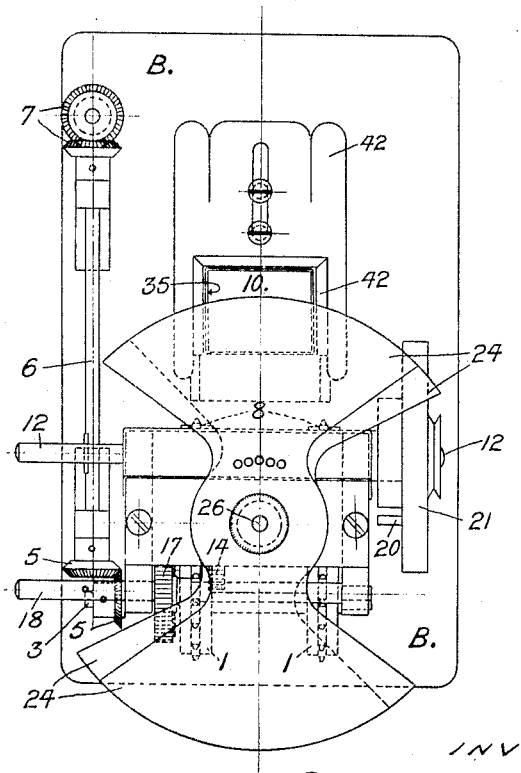
WITNESSES
W. P. Burk
John A. Percival
INVENTOR
George Charles Thomas
BY G. C. THOMAS.
APPARATUS FOR TAKING KINEMATOGRAPHIC (OR OTHER) PHOTOGRAPHS AND PROJECTING SAME.
APPLICATION FILED SEPT. 3, 1910.
1,040,591.
Patented Oct. 8, 1912.
4 SHEETS—SHEET 4.
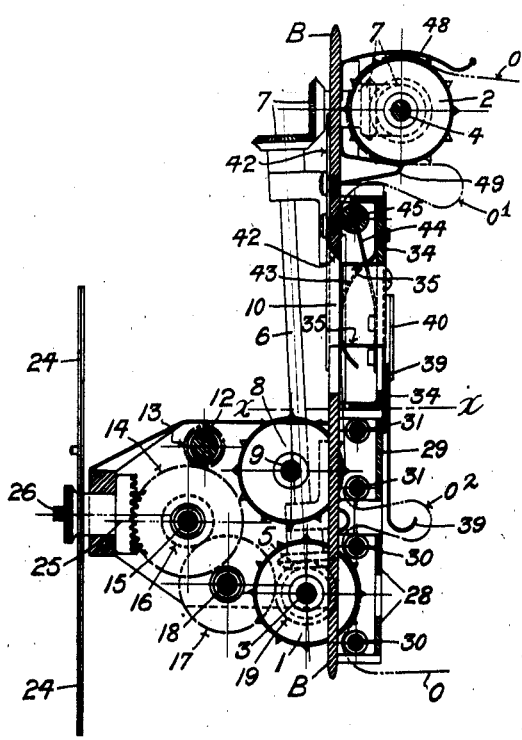
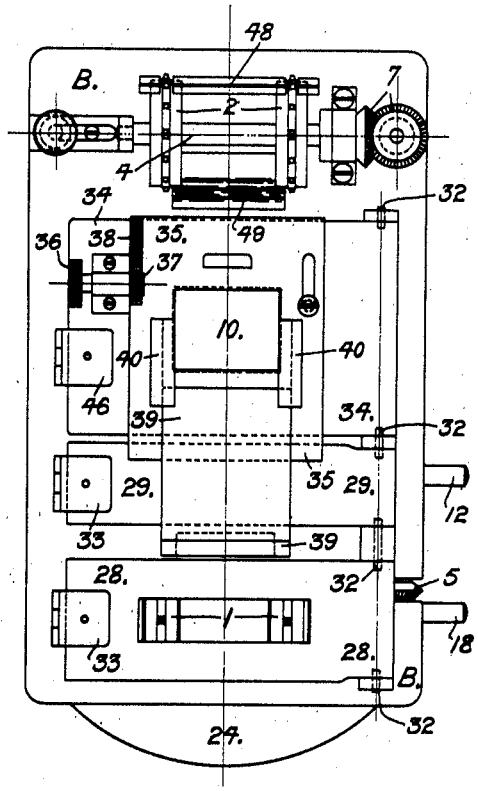
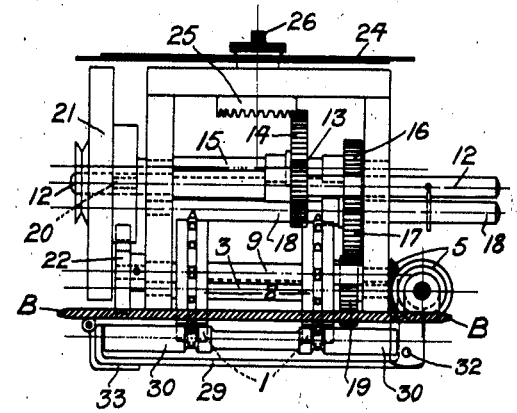
WITNESSES
W. P. Burke
John A. Percival
INVENTOR
George Charles Thomas
BY John Wallace White
ATTY.

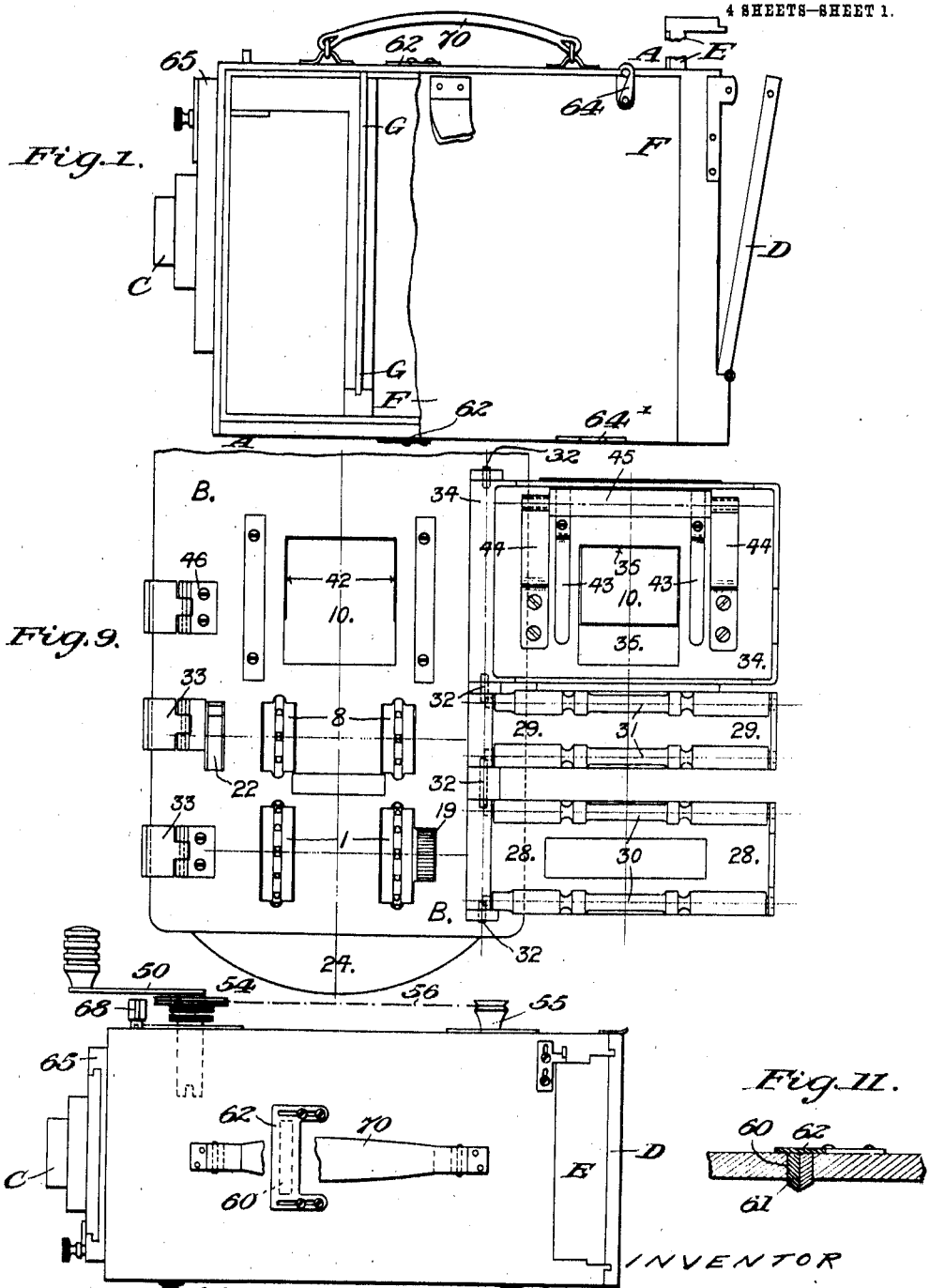

UNITED STATES PATENT OFFICE.

GEORGE CHARLES THOMAS, OF LISCARD, ENGLAND.

APPARATUS FOR TAKING KINEMATOGRAPHIC (OR OTHER) PHOTOGRAPHS AND PROJECTING SAME.

1,040,591. Specification of Letters Patent. Patented Oct. 8, 1912.

Application filed September 3, 1910. Serial No. 580,360.

*To all whom it may concern:*

Be it known that I, GEORGE CHARLES THOMAS, a subject of the King of England, residing at 2 Beach Bank avenue, Liscard, in the county of Chester, England, have invented new and useful Improvements in Apparatus for Taking Kinematographic (or other) Photographs and Projecting Same, of which the following is a specification.

This invention has reference to cameras or apparatus for taking photographs, and more particularly kinematographic photographs and ordinary photographs, and for projecting them or "slides" onto a screen or other surface; and it has primarily for its object to provide an apparatus of this kind which is simple and inexpensive, and at the same time accurate and certain in action, and in which can be used the standard sized kinematograph film, as well as other or special kinds of films (or their equivalent), and is easily worked or used, and generally convenient and advantageous.

The invention will be fully described in connection with the drawings hereto annexed, which illustrate a camera according to it constructed and adapted to take kinematographic photographs on films of the standard size and kind, and ordinary photographs, and also to project them.

In the drawings, Figure 1 is a side elevation of the apparatus, with the side door partly broken away; Fig. 2 is a side elevation showing the opposite side to that shown in Fig. 1; Fig. 3 is an end view; and Fig. 4 is a plan. Fig. 5 is an outside side elevation, Fig. 6 an end elevation, Fig. 7 a sectional side elevation taken on the center line Fig. 8, Fig. 8 an elevation viewed from the back, of the film and shutter operating moving mechanism; and Fig. 9 is an elevation of the mechanism viewed from the same side as Fig. 8, but with the parts opened out; and Fig. 10 is a sectional plan of the mechanism taken on the line $x$—$x$ of Fig. 7. Fig. 11 is a detail showing a light trapped aperture in the top and bottom of the apparatus.

Referring now to the drawings, A is the general case of the apparatus, which is in the form of a box camera; and B generally designates the frame which fits within, and is adapted to slide in and out of the case A, and which carries the film moving mechanism and shutter.

C is the lens at one end of the case; D is a hinged door at the back end of the camera; and E is a screen for focusing.

The whole of one side of the camera case is in the form of a hinged door F, which gives general access to the interior.

The slide frame B, carrying the mechanism for moving the film shown in Figs. 5 to 10, is capable of being placed in the camera by sliding it in a suitable grooved way G inside it, when the door F is opened down upon its hinges.

The film moving mechanism comprises two pairs of toothed sprocket wheels, a pair 1 being at the lower end, and the other pair 2 being at the top; and their carrying spindles 3 and 4 respectively are geared together through beveled toothed wheels 5, the vertical shaft 6, and bevel wheels 7; and the spindle 3 is rotated by hand actuated gear, hereinafter described. The sprocket wheels 1 and 2 are thus driven positively and continuously, and they are adapted to feed the film to the mechanism from the inside of the camera behind the frame B (say at the back of this chamber), and also to feed it back into the camera onto a lower or taking up spool, as the kinematographic photograph is being taken. The film paying off and taking up spools are not shown in the drawings, they being of usual construction. Between the sprocket wheels 1 and 2, is a further pair of toothed or sprocket wheels or rollers 8, mounted on an axle 9, and intermittently operated at the same time as the wheels 1 and 2, and which actually and positively effect the movement of the film intermittently past the exposure aperture 10 in the frame B; while, as stated, the other wheels 1 and 2, respectively move the film positively to these intermittent intermediate rollers 8, and away from same, but continuously. The upper pair of rollers 2, as already stated, takes the film from inside the camera and feeds it to the intermittently moving middle pair of wheels 8; and the lower pair 1 takes it from the intermittently moving pair of wheels 8, and feeds and delivers it to the taking up spool inside the camera.

The film in Fig. 7 is designated O; and between the upper wheels 2 and the intermediate wheels 8, a loop $o^1$ of slack film is arranged to exist, as shown; while between the middle sprocket wheels 8, and the lower wheels 1, another loop $o^2$ of film O is arranged to exist, as shown. This enables the intermittent and relatively quick action of the rollers or wheels 8, which actually moves the film past the exposure aperture 10 to take place; while the slower action of the feeding in and paying out sprocket wheels 1 and 2 is constant.

The intermittently moving wheels 8 project only a slight distance beyond the surface of the frame plate B over which the film O slides; while the lower pair 1 projects farther beyond this surface, so as to give a positive supply to the lower spool in the camera; while the supply or upper pair of sprocket wheels or rollers 2 stand in front of the plate B, over the top of which the film passes, so as to form a more reliable grip to the film in pulling it off the upper spool in the film box.

To operate the mechanism at the required rate, for projecting the photographs on the film, onto a screen or otherwise, as in kinematographic exhibition, the movements are effected by turning the spindle 18, with which the sprocket wheel 1 is geared, by the turning key 50—which is adapted to receive it.

In some cases the speed of the film moving sprocket wheels may be required to be reduced from that of the primary spindle 12, and the film to be moved relatively slowly over the exposure aperture 10. In this case the continuously operating wheels 1, 2 and 8, are revolved, from the spindle 12—which is actuated from outside through a handle as hereinabove described—through a small pinion 13 upon it; a toothed wheel 14 on the spindle 15 with which 13 meshes; a pinion 16 on the spindle 15; a toothed wheel 17 on the spindle 18 with which the pinion 16 meshes; and a toothed wheel 19 on the spindle 3, driven from the toothed wheel 17. By this action the intermittently moving sprocket wheels 8 are, through gear wheels 17 and 19, also moved the same amount as the wheels 1 through a pin 20 on the disk wheel 21, fixed on the spindle 12; the pin operating in connection with a "Geneva stop" gap wheel 22, which is fixed on the spindle 9 of the sprocket wheels 8. Hence, in each revolution of the shaft 12 and wheel 21, the wheel 22 will be driven one-quarter of a revolution, there being four gaps in it; while during the moments of projection, it will be held stationary by means of the periphery of the wheel 21, in the well known way of a Geneva stop mechanism.

The gearing just described drives, in addition to the film moving rollers, the revolving shutter 24. This is effected through the toothed wheel 14, which meshes with a crown wheel 25, fixed on the spindle 26 carrying the shutter 24. By this means, the shutter, which is of duplex kind, will be operated, i. e., revolved, over the aperture in the end of the casing, over which the lens C is fitted.

When taking kinematographic pictures, the apparatus will be operated in a similar manner to that just described.

In connection with the rollers or sprocket wheels 1 and 8, there are employed gates 28 and 29, respectively, having a pair of grooved rollers 30 and 31 in connection with them respectively, which are arranged to bear on the side of the film O opposite to that upon which the wheels 1 and 8 operate; and they are so arranged in relation to the teeth of these sprocket wheels that their parts which actually bear upon the film will be closer to the axles of these sprocket wheels than the ends of the teeth; and so they keep it—the film—held on the feed rollers or sprocket wheels in the required way, and at the same time allow of any extra thickness of film to pass through. The gates 28 and 29 are hinged at one side at 32, so that they can be opened when it is desired to thread a film into position, and to gear up with the wheels 1 and 8; and after placing it in position, with the loop of slack between them and the wheels 1 and 8, the gates are closed and fastened, and held in position, by means of the hinged clip fasteners 33. Above the intermediate feed rollers or sprocket wheels 8, the exposure aperture 10 in the frame plate B is provided as described; and in connection with and over this aperture, there is a gate 34, having a short tubular or "box" aperture 35, which extends from the back of the gate, practically to the face of the aperture 10; and this tubular or box aperture is movable up and down in the gate 34 (which has an opening in it to admit of the movement of this box 35), the movement being effected by a milled disk 36, the spindle of which is carried in the gate 34, and has on its inner end a toothed pinion 37, meshing with a rack 38 on the front plate of the box aperture 35, which slides up and down on the outside of the gate 34. By this means, the opening or aperture through which light will strike the film may be adjusted vertically as required, as when projecting the pictures. There is also used in connection with this box aperture 35, a slide 39, held, and adapted to move in guides 40, by which this aperture may be opened or closed, as and when desired, for taking. There is also used in connection with the main frame plate B, a sliding or adjustable shutter 42 in the exposure aperture 10, which is raised to its full extent when projecting, as shown in Figs. 6 and 7, so as to enable the movable aperture 35 in the gate 34 to move up and down as required; while for taking kinematograph photographs, both aperture shutters or regulators 35 and 42 are lowered to their full extent, which brings them into line with the camera lens C. The gate 34 carrying the adjustable aperture has a saddle or bow-spring 43 on each side, bearing on the face of the plate B, when the gate is closed, and secured at their upper ends to the gate; and it—the gate—also carries on spring arms 44, a roller 45, which presses the film O on to the surface of the plate B. The former springs 43 bear upon the sides of the film, and keep it firm and flat with an even pressure on the main frame plate B, over the aperture 10, over which it slides; while the roller 45 keeps the film steady on the plate as it moves toward the aperture; while the springs 44 holding this roller 45, permit it to move away from the plate B, and go back again, as and when extra thicknesses of film pass through and thus preserve evenness and steadiness of picture. The gate 34 is held in the closed position by a hinged catch 46, which is similar to the catches 33; and all these gates are thereby held in their active or closed position by these catches in a manner that will give the required firmness of position in relation to the film.

The upper feeding in toothed sprocket wheels 2 are placed entirely on the rear side of the plate B; and they have over them a guide 48 for the film, consisting of a curved thin sheet metal plate, between which and the teeth of the wheels 2 the film passes from the film box; the teeth of these wheels projecting through spaces between the different members of the guide plate 48 when at their upper position, as shown in Figs. 7 and 8. By means of this guide the film is held in contact with the sprocket wheels. Immediately below the sprocket wheels 2, there is another guide 49, also carried from the plate B, which holds the film to the wheels 2 and directs the film outward, and helps to form the upper loop of film between these sprocket wheels, and the intermittent wheels 8 and aperture 10 over which the film slides. The other sets of toothed or sprocket wheels 1 and 8 are on the opposite side of the plate B to the wheels 2, and are carried from it and project through apertures in it.

The Geneva stop mechanism for operating the intermittent film moving roller 8 causes the film to be alternately held or remain stationary over the aperture 10, and to be suddenly and quickly moved the required amount over this aperture, during which time the shutter will have closed the light aperture or lens; while when the film is stationary, it will have opened it.

With regard to the actuating of the film moving mechanism, the spindles 12 and 18 can be engaged and geared up with the operating handle or handle key 50 shown in Fig. 4, by apertures 51 provided on the side of the case A, in connection with which the hinged closing shutters 52 operate; so that when the one aperture is opened for engaging one of the shafts or spindles by the crank key 50, the other can be closed; and, vice versa. And when no handle is used, both can be closed, so as to make the camera light-tight, or prevent light getting into it. The tubular part 53 of the crank key 50 is made to fit tightly in the apertures or holes 51 so as to assist in preventing light passing into the camera in this way. Further, in connection with the crank key 50, there is a grooved pulley 54; and in connection with the winding on roller of the film in the film box placed at the back of the inside of the camera, there is a pulley 55, adapted to be fitted onto the axle of this roller, and which projects on the outside of the camera; and between these pulleys 54 and 55, there is an india-rubber or flexible cord, or a chain or the like 56, by means of which, as the film is fed through the moving mechanism and discharged from the roller 1, it will be positively wound up onto the take on roller.

Over the aperture through which the pulley 55 enters the side of the apparatus, there is provided a closing shutter 57 similar to the shutters 52, for closing up this aperture when the wheel 55 is removed, as and when taking snapshot photographs, when the mechanism and film box are not required in the camera.

In the top of the camera or box case A, and in the bottom at a corresponding point, there is provided an aperture 60, with a light excluding means or joint of any known suitable kind, marked 61 in Fig. 11, for passing a film through from the outside when it is wanted so to do; and these apertures will have a sliding shutter 62 in connection with them for closing them permanently, to keep out the light, when using the camera for taking purposes.

Access is had to the whole of the interior of the apparatus, namely, the box or case A, and all the movable parts used inside it may be inserted or withdrawn, through the one side, by means of the hinged door F, which has its hinges 64¹, one of which is shown in Fig. 1 preferably at the bottom, and is secured by catches 64 at the top.

The lens portion C is mounted on a movable carrier 65, which has a bellows portion 66 between it and the end of the body A; and these portions are moved in or out, as may be required, by means of a rack 67, operated by the turning button 68 in the known way.

At the back end of the camera box A, the door D is hinged at its lower part, and it can be folded down and opened and closed alternately, as desired for focusing with a screen, or other object; and the slide E may be adapted to serve to carry a dark slide for taking photographs, snap shots, or time exposures in the usual way, or a film pack containing a set of ordinary photographic films or like photographic media; and at this part also the screen for focusing will be employed.

With regard to the apparatus generally, it will be seen that the camera or apparatus may constitute a hand apparatus (it being provided with a handle 70); and can be used in addition to kinematographic work, for practically all photographic purposes; and with the addition of a projecting standard for mounting the mechanism in, it can be used for projecting kinematographic pictures also, while at the same time it is light and handy for carrying about.

The word "film" used herein in connection with kinematographic photographs, is to be read as including besides the kind of films that are ordinarily used in kinematographic apparatus, namely, in strips or ribbons of the usual film material, any other equivalent or suitable media, arranged or adapted to receive a plurality of successive light impressions, or have on it a succession of photographs; and as regards the means for taking ordinary photographs at back end of the camera, there may be used as the sensitized medium to receive the light impressions, in the movable carrier, either plates, films, rolls or other known suitable forms of such media.

What is claimed is:—

1. Apparatus for taking kinematographic and ordinary photographic pictures, comprising in combination, a casing or box having a light aperture at one end thereof; a removable means for carrying sensitized photographic media for receiving a light impressed picture, at the opposite end of said casing; and a kinematographic medium moving mechanism disposed intermediate the said aperture and the means at the opposite end, adapted to be readily placed within the casing, and withdrawn therefrom, and adapted to be used for passing a photographic film between the light aperture and the said removable means; substantially as set forth.

2. In apparatus for taking kinematographic and ordinary photographic pictures, a camera box or casing; a movable mechanism for intermittently moving a film placed intermediate the front and back walls of the camera box, and adapted to be readily removed therefrom, and introduced into position; a door on one side of the box adapted to enable the said mechanism to be introduced and removed; a door at the back end of the camera box or casing; and a removable sensitive photographic medium carrier at the back part of the casing; substantially as set forth.

3. In apparatus for taking kinematographic and ordinary photographic pictures, a camera box or casing; a movable mechanism serving for moving a film, and having sprocket wheels, gearing and spindles, and disposed intermediate the front and back walls of the camera box or casing; means for carrying sensitive media at the rear of the camera box or casing; casing walls having grooves therein for enabling the said mechanism to be removably fitted in the casing; means for imparting motion to the spindles; a wall with apertures therein enabling the means for imparting motion to the spindles to be connected with one of the spindles from the outside of the casing; means for closing the said casing apertures and making the casing light tight; and a door for enabling the mechanism to be fitted in and removed from the casing; substantially as described.

In testimony whereof I have signed my name to this specification in the presence of two subscribing witnesses.

GEORGE CHARLES THOMAS.

Witnesses:
SOMERVILLE GOODALL,
DONALDSON PETER COULTER.